BINARY FULL ADDER AND "OR" CIRCUIT
Filed Nov. 13, 1962
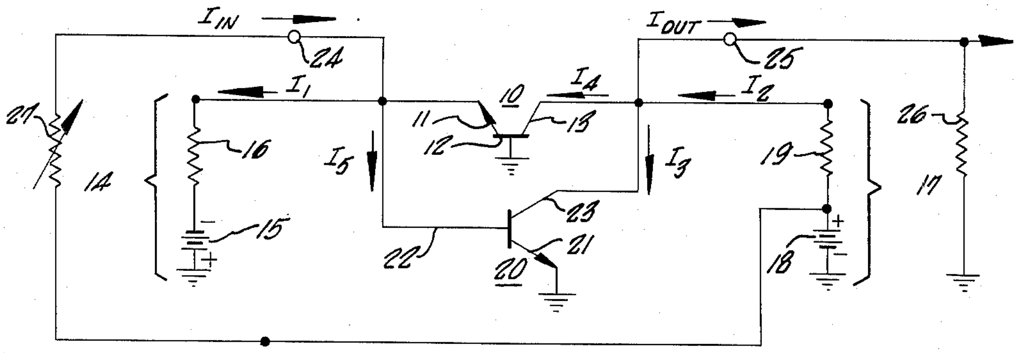
FIG. 1
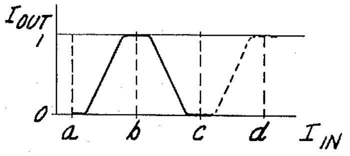
FIG. 2
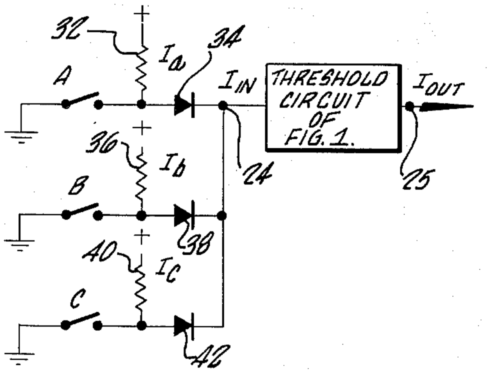
FIG. 3
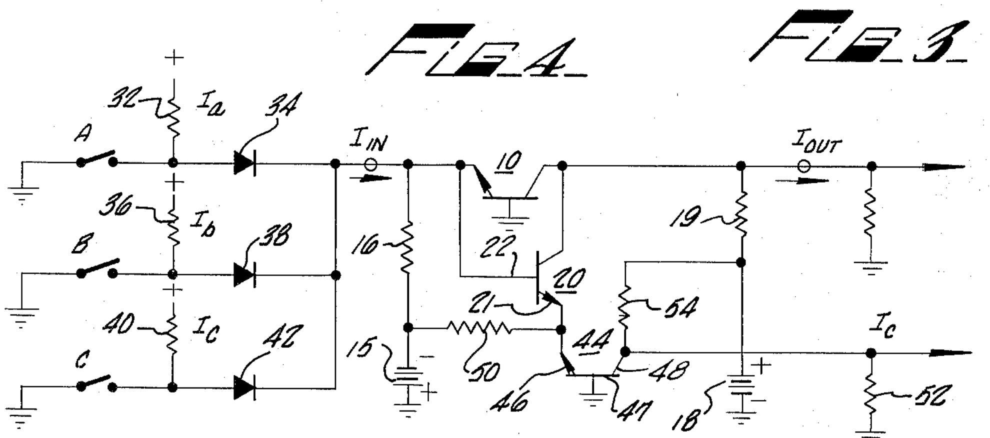
FIG. 4
| A | B | C | "EXCLUSIVE OR" $I_{OUT}$ | FULL ADDER $I_{OUT}$ | FULL ADDER $I_c$ |
|---|---|---|---|---|---|
| 0 | 0 | 0 | 0 | 0 | 0 |
| 1 | 0 | 0 | 1 | 1 | 0 |
| 0 | 1 | 0 | 1 | 1 | 0 |
| 0 | 0 | 1 | 1 | 1 | 0 |
| 1 | 1 | 0 | 0 | 0 | 1 |
| 1 | 0 | 1 | 0 | 0 | 1 |
| 0 | 1 | 1 | 0 | 0 | 1 |
| 1 | 1 | 1 | 0 | 1 | 1 |
FIG. 5
INVENTOR.
EDWIN S. LEE, III
BY
Christie, Parker & Hale
ATTORNEYS.

United States Patent Office 3,215,857
Patented Nov. 2, 1965

3,215,857

BINARY FULL ADDER AND "OR" CIRCUIT

Edwin S. Lee III, Altadena, Calif., assignor to Burroughs Corporation, Detroit, Mich., a corporation of Michigan Filed Nov. 13, 1962, Ser. No. 237,154
6 Claims. (Cl. 307—88.5)

This invention relates to binary logic circuits, and more particularly is concerned with a transistor threshold circuit which can be used to implement various logic functions.

The design of basic logic circuits for computers using diodes and junction transistors is well known. The present invention is directed to an improved transistor circuit which can be used to implement various basic logic functions and in particular which can be used to implement such functions as the "exclusive or" function or the full adder function. The present invention has the advantage that it is capable of implementing these functions using fewer diodes and transistors than are required in more conventional logic circuits.

In brief, the present invention provides a threshold type current-steering circuit in which increasing the input current produces a reversing change in output current between two levels. Various combinations of input signals can be made to produce one level or the other in the output current according to the particular logic function being implemented. The circuit comprises a first transistor with the emitter connected through a resistor to a first potential point, the collector connected through a resistor to a second potential point, and the base connected to an intermediate reference potential point. The input provides a current path from the emitter while the output provides a current path to the collector. A second transistor is connected with the emitter connected to the reference potential point, the base being connected to the emitter of the first transistor and the collector connected to the collector of the first transistor, so the second transistor is normally not conductive. As the input shunts an increasing amount of current, the first transistor turns off, providing an increase in the current shunted to the output until the second transistor begins to conduct. Shunting of additional current through the input circuit then causes a drop in the current through the output circuit. By changing the level of input current in incremental steps of the right amount, the output current can be shifted between two discrete levels.

For a more complete understanding of the invention, reference should be made to the accompanying drawing wherein:

FIGURE 1 is a schematic circuit diagram of the basic threshold circuit of the present invention;

FIGURE 2 is a graphical plot illustrating the operation of the circuit of FIGURE 1;

FIGURE 3 is a schematic diagram of an "exclusive or" circuit using the present invention;

FIGURE 4 is a schematic diagram of a full added circuit; and

FIGURE 5 is a chart showing the logic functions of the circuits of FIGURES 3 and 4.

Referring to FIGURE 1 in detail, the numeral 10 indicates generally a junction transistor having an emitter 11, base 12, and collector 13. The base-emitter circuit is connected across a source 14 of substantially constant current $I_1$. The source 14 may include a potential source 15 with a relatively large series resistance 16.

The collector-base circuit of the transistor 10 is connected across a source 17 of substantially constant current $I_2$. The source 17 may include a potential source 18 and a relatively large series resistance 19. The base of the transistor is connected to a reference potential such as ground.

A second junction transistor 20 of the same conductive type has its emitter electrode 21 connected to the ground reference potential while the base electrode is connected to the junction between the emiter 11 of the transistor 10. The collector electrode 23 of the second transistor 20 is connected to the collector electrode 13 of the first transistor 10.

An input terminal 24 is connected to the common junction formed by the resistor 16 and the emitter electrode 11 of the first transistor 10, while an output terminal 25 is connected to the common junction between the resistor 19 and the collector 13 of the first transistor 10. In normal operation, the output terminal 25 is connected to one end of a load impedance, such as indicated at 26, which provides a current path back to the ground reference potential point. The input terminal 24 is normally connected to input gating circuits such as will hereinafter be described but which may be indicated as in FIGURE 1 by a variable resistance 27 connected to a positive potential, such as provided by the potential source 18. By varying the resistance 27, the amount of input current at the terminal 24 can be varied.

Considering the operation of the circuit of FIGURE 1, assuming that the resistance 27 is set to a relatively large value so that the input current $I_{in}$ is initially substantially zero, the transistor 10 is biased conductive and a current $I_4$ flows from the source 17 through the collector-emitter circuit and through the source 14. Assuming the base current is small $I_1$ is substantially equal to $I_4$. Since no base current flows in the transistor 20, this transistor is biased off and draws no current. Likewise, since the output terminal 25 is at substantially ground potential, the output current $I_{out}$ is substantially zero. This is shown graphically in FIGURE 2, which is a plot of output current $I_{out}$ as a function of input current $I_{in}$. When $I_{in}$ is zero, $I_{out}$ is zero.

As the value of the resistance 27 is decreased, the input current $I_{in}$ increases. Since $I_1$ is substantially constant, the amount of current $I_4$ passing through the transistor 10 decreases as $I_{in}$ increases. Since $I_2$ is also substantially constant, as $I_4$ decreases, the output current $I_{out}$ begins to increase. As $I_{in}$ continues to increase, the potential on the emitter 11 goes slightly positive due to the larger current flow through the resistor 16. This turns on the transistor 20 so that the collector-emitter circuit of the transistor 20 begins to draw a current $I_3$ from the source 17. As the transistor 20 becomes more conductive, the output current $I_{out}$ decreases as more of the current $I_2$ from the source 17 is directed to ground through the transistor 20. The drop of the output current $I_{out}$ is shown by the curve of FIGURE 2.

From the description thus far, it will be appreciated that the circuit of FIGURE 1 provides, as shown in FIGURE 2, an output current which increases from substantially zero when the input current has a value as indicated at point *a* to a threshold value when the input current reaches point *b*. The output current then falls back to zero as the input current increases to a value at point *c*. This threshold property of the circuit of FIGURE 1 may be used to implement the "exclusive or" function by an arrangement as shown in FIGURE 3. This shows a three-input gating circuit in which the binary inputs A, B, and C are shown as mechanical switches, but may be any source of binary information. When any of the switches are closed, they provide zero current to the input of the threshold circuit. If any one of the switches is open, it provides an increment of current from a positive source through a resistor and diode. Thus when the switch A is open, a current $I_a$ is provided through a resistor 32 and diode 34, the switch B, when open, provides a current $I_B$ through a resistor 36 and diode 38, and when the switch C is open, it provides a current $I_C$ through a resistor 40 and diode 42. Thus the input current to the threshold circuit can be increased in incremental amounts which may correspond to the values *a*, *b*, and *c* of FIGURE 2, when one, two or three of the switches is opened respectively. The table of FIGURE 5 shows the relation of the output current for the various conditions of the switches A, B, and C. With all three switches closed, corresponding to all binary zeros on the input, the input current to the threshold circuit is zero and the output current from the threshold circuit is zero. If any one of the three switches is open, an input current is provided which corresponds to the threshold at point *b* in FIGURE 2. If more than one of the three switches is open, the input current is further increased to a value corresponding to point *c* in FIGURE 2, in which case the output current is returned to zero. The table of FIGURE 5 clearly indicates that the logic conditions of an "exclusive or" logic circuit are achieved.

Referring to FIGURE 4, a circuit for implementing the full adder function is shown. The full adder circuit is substantially the same as the "exclusive or" circuit of FIGURE 3 on the input, namely three binary input signals are provided each of which changes the input current to the threshold circuit by a unitary amount. The circuit of FIGURE 4, however, is modified from that of FIGURE 3 to provide a second threshold to provide an output current when all three input switches are open. The full adder is the condition represented in the right-hand set columns of the table of FIGURE 5. The double threshold condition is indicated by the dotted line in FIGURE 2 in which the output current is shown to increase again to a second threshold with an input current level at point *d*, so that an output current corresponding to the binary one condition is generated when all three signals are present on the input.

This is accomplished as shown in the circuit of FIGURE 4 by the addition of a third transistor 44. The transistor 44 is connected with its emitter 46 connected to the emitter 21 of the transistor 20. The base of the transistor 44 is connected to the ground reference potential. The emitter 46 is also connected to the negative potential 15 through a series resistance 50. The collector 48 is connected to the positive potential source 18 through a large current limiting resistor 54. An output current $I_c$ may be derived from the battery 18 through the load resistor 54 and an output impedance 52 when the transistor 44 is biased off.

In operation, the threshold circuit including the transistors 10 and 20 is substantially the same as described above for the smaller values of input current $I_{in}$. With substantially zero input current, the transistor 10 is conductive and no output current is flowing. Also the transistor 44 is conducting and the transistor 20 is cut off. Because the transistor 44 is conducting, the output current $I_c$ is substantially zero. As the input current increases as by opening any one of the switches A, B and C, the output current $I_{out}$ initially increases, so that with one unit of current being supplied by the input circuit, as by opening one of the three switches A, B, and C, the output current $I_{out}$ reaches a unit value. The transistor 20 remains off because even with the emitter current of the transistor 10 approaching almost zero, the potential at the base 22 is still not positive with respect to the emitter 21. The emitter 21 is clamped at substantially but slightly below zero potential by the conducting transistor 44. As the input current $I_{in}$ is further increased, as by opening any two of the switches A, B and C, the transistor 20 is turned on and begins to conduct. The current through the base-emitter circuit of the transistor 44 goes to zero as the current through the transistor 20 is increased, since the current through the resistor 50 is substantially constant. By making resistor 50 somewhat smaller than 16, the transistor 20 is turned on even though the transistor 44 is turned off. As a result of the transistor 44 being turned off the current $I_c$ through the output load resistor 52 increases to a unit value. Thus if two switches of the three switches A, B, and C are opened, providing two units of input current $I_{in}$, the output current $I_{out}$ is reduced to zero and the current $I_c$ is increased to a unit value.

If the input current $I_{in}$ is increased beyond two units of current, as by opening all three switches A, B and C, the base current of the transistor 20 increases accordingly. Because the potential source 15 and the large series resistor 50 act as a substantially constant current source, the collector current of the transistor 20 is reduced accordingly. As the collector current decreases, the output current $I_{out}$ again increases, as indicated by the dotted line in FIGURE 2. At some value *d* of the input current $I_{in}$, corresponding to three units of input current, it will be seen that the output current $I_{out}$ again increases to substantially a unit value, thereby satisfying the last condition of the table of FIGURE 5 for a full adder.

From the above description, it will be recognized that a threshold circuit has been provided which is useful in implementing logic functions. By varying the relative values of the resistors 16 and 19, the shape of the curve of FIGURE 2 can be altered, as required to implement various functions.

What is claimed is:

1. A threshold logic circuit for generating an output signal which switches from a first output level to a second output level and back to the first level with a change in an input signal in one sense from a first level to a second level and to a third level, comprising a first transistor having base, emitter, and collector electrodes, means for holding the base at a fixed reference potential, a first resistor connecting the emitter electrode of the first transistor to a first potential, the input signal being connected to the emitter of the first transistor, a second resistor connecting the collector electrode of the first transistor to a second potential, the first and second potentials being of opposite polarity relative to the reference potential and of such polarity that the transistor is normally rendered conductive, a second transistor of the same conductive type as the first transistor and having base, emitter, and collector electrodes, the base electrode of the second transistor being connected to the emitter electrode of the first transistor and the collector electrode of the second transistor being connected to the collector electrode of the first transistor, means for clamping the emitter electrode of the second transistor at a potential level which does not materially exceed the reference potential in the polarity direction of said first potential, whereby the second transistor is normally held nonconductive, the means for deriving an output current at the common junction between the collector electrodes of the two transistors.

2. A threshold logic circuit for generating an output signal which switches from a first output level to a second output level and back to the first level with a change in an input signal in one sense from a first level to a second level and to third level, comprising a first transistor having base, emitter, and collector electrodes, means for holding the base at a fixed reference potential, a first constant current source connected between the emitter and base of the first transistor, the input signal being connnected to the emitter of the first transistor, a second constant current source connected between the collector and base of the first transistor, a second transistor of the same conductive type as the first transistor and having base, emitter, and collector electrodes, the base electrode of the second transistor being connected to the emitter electrode of the first transistor and the collector electrode of the second transistor being connected to the collector electrode of the first transistor, means for clamping the emitter electrode of the second transistor at a potential level such that the second transistor is normally held nonconductive with no input signal, and means for deriving an output current at the common junction between the collector electrodes of the two transistors.

3. A binary full adder circuit for generating a sum binary signal and a carry binary signal in response to three binary input signals, comprising a first transistor having base, emitter, and collector electrodes, the base being connected to a reference potential, a first resistor connecting the emitter electrode of the first transistor to a first potential, a second resistor connecting the collector electrode of the first transistor to a second potential, the first and second potentials being of opposite polarity relative to the reference potential and of such polarity that the transistor is normally rendered conductive, a second transistor of the same conductive type as the first transistor and having base, emitter, and collector electrodes, the base electrode of the second transistor being connected to the emitter electrode of the first transistor and the collector electrode of the second transistor being connected to the collector electrode of the first transistor, a third transistor having base, emitter, and collector electrodes, a third resistor connected between the emitter electrode of the third transistor and the first potential, the base electrode of the third transistor being connected to the reference potential, the emitter electrode of the third transistor being connected to the emitter electrode of the second transistor, a fourth resistor connecting the collector electrode of the third transistor to said second potential, a first output impedance connected between the collector electrode of the first transistor and the reference potential, the binary sum signal being derived across the first output impedance, a second output impedance connected between the collector electrode of the third transistor and the reference potential, the carry bindary signal being derived across the second output impedance, and means for adding incremental amounts of input current at the common junction between the first resistor, and the emitter of the first transistor and the base of the second transistor in response to each of the three binary input signals.

4. A binary full adder circuit for generating a sum binary signal and a carry binary signal in response to three binary input signals, comprising a first transistor having base, emitter, and collector electrodes, the base being connected to a reference potential, a first constant current source connected between the emitter and base of the first transistor, a second constant current source connected between the collector and base of the first transistor, a second transistor of the same conductive type as the first transistor and having base, emitter, and collector electrodes, the base electrode of the second transistor being connected to the emittter electrode of the first transistor and the collector electrode of the second transistor being connected to the collector electrode of the first transistor, a third transistor having base, emitter, and collector electrodes, a third constant current source connected between the emitter and base of a third transistor, the base electrode of the third transistor being connected to the reference potential, the emitter electrode of the third transistor being connected to the emitter electrode of the second transistor, a fourth constant current source connected between the collector and base of the third transistor, means for deriving a first output current at the common junction between the collectors of the first and second transistor, means for deriving a second output current at the collector of the third transistor, and means for adding increment amounts of input current at the common junction between the first resistor, the emitter of the first transistor and the base of the second transistor in response to each of the three binary input signals.

5. A threshold logic circuit for setting an output signal to one of two levels in response to different levels of an input signal, the circuit comprising a first transistor having emitter, collector, and base electrodes, first and second resistors connected respectively to the collector and emitter electrodes to form a series current path, a voltage source providing voltages above and below an intermediate reference potential, the resistors being connected to opposite ends of the voltage source, means for holding the base electrode at the fixed intermediate reference potential of said voltage source, a second transistor having base, emitter and collector electrodes, the base and collector electrodes of the second transistor being connected respectively to the emitter and collector electrodes of the first transistor, means for clamping the emitter electrode of the second transistor substantially at the intermediate potential, input means connected to the junction between the base of the second transistor and the emitter of the first transistor for changing the base and emitter currents, and output means for deriving an output current from the common junction between the collector electrodes of the two transistors.

6. A threshold logic circuit comprising a first current source of one polarity potential relative to a reference potential, a second current source of opposite polarity potential relative to the reference potential, a first transistor having an emitter-base circuit directly connected through negligible resistance across the first current source, and a base-collector circuit connected across the second current source, the emitter-collector circuit being connnected between the first and second sources in series, a second transistor having an emitter-base circuit connected in parallel with the emitter-base circuit of the first transistor but with the forward direction of current flow reversed, the emitter-collector circuit of the second transistor being connected across the second current source, the base of the first transistor and one end of the current sources being connected to a common reference junction with substantially zero resistance, whereby the base of the first transistor and one end of both current sources are held at the common reference potential, a source of variable input current being connected across the emitter-base circuit of the first transistor, and an output load connector across the base-collector circuit of the first transistor.

References Cited by the Examiner

UNITED STATES PATENTS 2,903,602 9/59 Fleisher ............. 307—88.5

DAVID J. GALVIN, *Primary Examiner.*